Figure 1:
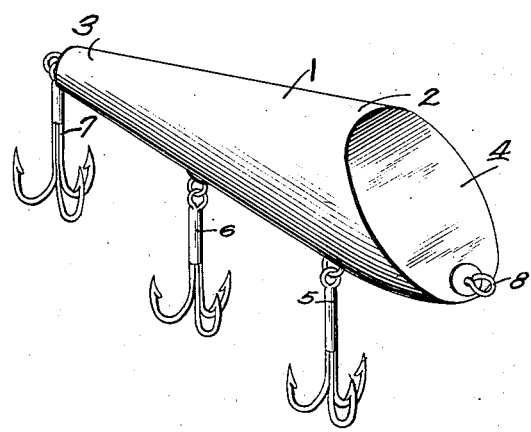

F. R. WILBER & H. E. BALL.
ARTIFICIAL BAIT.
APPLICATION FILED SEPT. 8, 1913.

1,086,256.

Patented Feb. 3, 1914.

Inventors
Ford R. Wilber
and
Horace E. Ball

Witnesses

By Mason Fenwick Lawrence

Attorneys

UNITED STATES PATENT OFFICE.

FORD R. WILBER AND HORACE E. BALL, OF PAW PAW, MICHIGAN, ASSIGNORS TO THE MOONLIGHT BAIT COMPANY, OF PAW PAW, MICHIGAN.

ARTIFICIAL BAIT.

1,086,256.  Specification of Letters Patent.  Patented Feb. 3, 1914.

Application filed September 8, 1913. Serial No. 788,696.

*To all whom it may concern:*

Be it known that we, FORD R. WILBER and HORACE E. BALL, citizens of the United States, residing at Paw Paw, in the county of Van Buren and State of Michigan, have invented certain new and useful Improvements in Artificial Baits; and we do hereby declare the following to be a full, clear, and exact description of the invention, such as will enable others skilled in the art to which it appertains to make and use the same.

This invention relates to improvements in baits and an object of the invention is to provide a bait of very simple construction which shall have several distinct motions as the bait is drawn through the water, and to provide a bait which may also be used as a surface bait when at rest or when drawn at a moderate rate of speed and be an under water bait when drawn rapidly, the depth of the bait being dependent upon the rate of drawing.

A further object of the invention is to provide a bait having an inclined face, shown planate, part of which is normally located beneath the surface of the water so that when the bait moves forward in the direction of the face the water will act to drive the bait downwardly.

Another object of the invention is to provide a bait having no auxiliary ballast but having the hooks so arranged as to keep the bait in an upright position with a maximum of surface below water level.

A still further object of the invention is to provide a bait having an inclined face, planate or otherwise, with the draft line attached to the face below the center of gravity of the bait.

With these and other objects in view which will appear as the description proceeds, the invention resides in the combination and arrangement of parts as described and claimed and as illustrated in the drawings.

Figure 3:
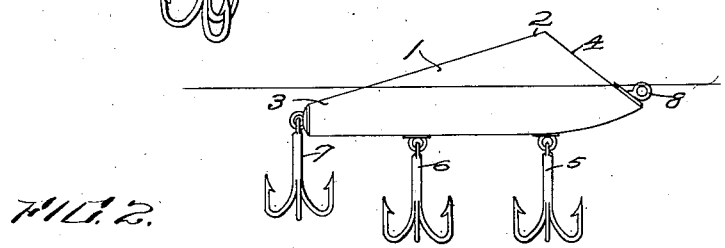
Figure 2:
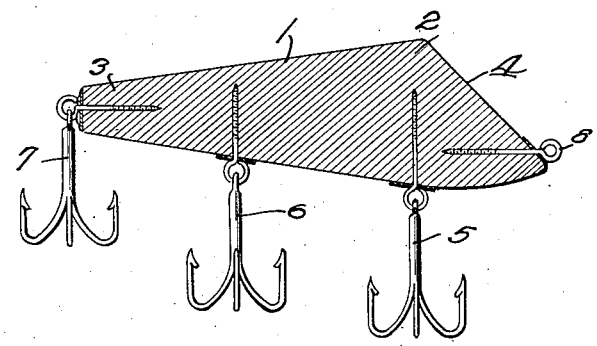

In the drawings, where similar reference characters designate corresponding parts, and wherein the principles of our invention are incorporated in one specific embodiment, Figure 1 is a perspective view of the bait; Fig. 2 is a vertical longitudinal section of the bait, and Fig. 3 is a view showing the bait floating in water.

Baits have heretofore been proposed with upwardly-forwardly extending planate faces which coöperated with the water to keep the forward end of the bait which usually carries a spinner, etc., from descending as the bait is drawn forward, but the present invention contemplates the use of a downwardly forwardly extending face to lower the bait as the same is drawn through the water, there being no spinner to support. Various baits have had counter-weights for ballasting and have been formed to simulate a minnow, whereas the present bait has hooks arranged along the bottom to maintain equilibrium without a counter-weight, and no particular attempt is made to simulate minnows or the like although this can be done.

A more detailed description is to be had by reference to the accompanying drawing, where 1 designates the body of the bait which is preferably tapered from one end to the other to provide a large end 2 and a small end 3. The bait body may be made of any suitable material and may be provided with any desirable color scheme. The larger end of the body is provided with a downwardly-forwardly extending face which may be at an angle of 40° approximately with the horizontal although we do not wish to be limited to this angle as others will obviously produce desirable results. This face 4 may be planate and it is understood that wherever the word planate is used the word curved or similar word may be substituted, as long as the surface thus defined accomplishes substantially the results obtained by using a planate face. It is apparent that by having the face formed at the larger end of the bait that the largest deflecting surface possible is obtained. The planate face is so formed that the lower portion thereof is always under water so that the water may act upon a portion of the face when the draft line is first pulled to draw the entire face under water.

Arranged in a line along the bottom of the body 1 are several suitable hooks of any form, a hook 5 being located beneath the largest portion of the bait, a hook 6 beneath the central smaller portion, and a hook 7 at the small end of the body. This is one arrangement but others may be used as long as the weight is distributed evenly to preserve equilibrium and thus avoid the use of a counter-weight. The body is made of light material so that the hooks form an effective ballast. By referring to Fig. 3, it will be seen that the greater part of the weight of the hooks is carried by the smaller end of the body, from which two of the three hooks depend so that the said smaller end is completely submerged in water to display as large a surface to fish as possible. These hooks may have associated therewith such lures as are common in fishing tackle and are pivoted to swing universally with respect to the body. The rear hooks serve also to weight the smaller end so that a sudden forward movement is accompanied by a downward movement of the planate face and the angle between the face 4 and the horizontal is increased as the larger end falls below its normal position.

The means for attaching the draft line comprises an eye hook 8 secured to the lower portion of the planate face at a point below the normal water line. It is very desirable to have the eye hook secured to the face 4 at a point below the center of gravity of the body 1, so that the horizontal pull will be along a line which if extended would pass below the center of gravity of the body 1.

It is found that a bait constructed as described, has at least three distinct motions while being drawn through the water: viz, first, a side motion resembling a fish swimming in the water, caused by the contact of the water with the peculiar shaped head of the bait as it is drawn through the water. Second, an up and down, or dancing motion, caused by the action of the water on the head of the bait, depending on the speed at which the bait is being drawn through the water; and third, a zig-zag motion caused by the action of the water on the bait as it is being drawn through the water, depending on the speed at which it is drawn through the water, and the position it is in at the time it starts to be drawn. Normally the bait will float, but by pulling on the draft line it may be caused to plow beneath the surface of the water and is therefore a surface and under water bait.

What we claim is:

1. A fish bait comprising a body having a forwardly-downwardly extending face, means secured to the face below a horizontal line passing through the center of gravity of the bait for attaching a fish line, and hooks carried by the body.

2. A fish bait comprising a body, means formed thereon adapted to lower the bait as the body is drawn through water, hooks carried by the body, and means located adjacent the forward end of the bait below a horizontal line passing through the center of gravity of the bait for securing a fish line.

3. A bait comprising a body having forwardly-downwardly extending means carried thereby adapted to lower the body as the same is drawn through the water, hooks secured to the bottom of the body, and means for securing a draft line to the bait, said means located below a horizontal line passing through the center of gravity of the bait.

4. A bait comprising a body the end of which has a forwardly and downwardly inclined face, hooks carried by the body, and means for securing a draft line to the inclined face below a horizontal line passing through the center of gravity of the bait.

5. A bait comprising a body tapering from one end to the other, the larger end being provided with a downwardly-forwardly inclined face, hooks secured to the body, and means carried by the face below a horizontal line passing through the center of gravity of the bait adapted to receive a draft line.

In testimony whereof we affix our signatures in presence of two witnesses.

FORD R. WILBER.
HORACE E. BALL.

Witnesses:
 HARRY A. CROSS,
 H. E. SHAEFER.